United States Patent [19]

Valaitis et al.

[11] 4,094,860

[45] June 13, 1978

[54] CONDENSATION PRODUCTS OF AROMATIC POLYHYDROXY COMPOUNDS AND POLYAMINO ALIPHATIC COMPOUNDS

[75] Inventors: Joseph Kestutis Valaitis, University Heights; Harold James Harwood, Stow, both of Ohio

[73] Assignee: The Firestone Tire & Rubber Company, Akron, Ohio

[21] Appl. No.: 558,038

[22] Filed: Mar. 13, 1975

Related U.S. Application Data

[63] Continuation of Ser. No. 371,636, Jun. 20, 1973, abandoned.

[51] Int. Cl.² .................. C08G 73/00; C08G 73/02

[52] U.S. Cl. ..................... 260/47 R; 260/32.6 N; 428/411; 428/457

[58] Field of Search ..................... 260/47 R, 824

[56] References Cited

U.S. PATENT DOCUMENTS

| 3,557,245 | 1/1971 | Phillips et al. ............... 260/824 |
| 3,798,201 | 3/1974 | Saferstein et al. ............ 260/47 R |

*Primary Examiner*—Lester L. Lee

[57] ABSTRACT

This invention relates to polymers prepared by the condensation of aromatic polyhydroxy compounds and polyamino aliphatic compounds, preferably dihydroxy and diamino compounds. Polymers which are stable at high temperatures are produced.

9 Claims, 2 Drawing Figures

FIG. 1
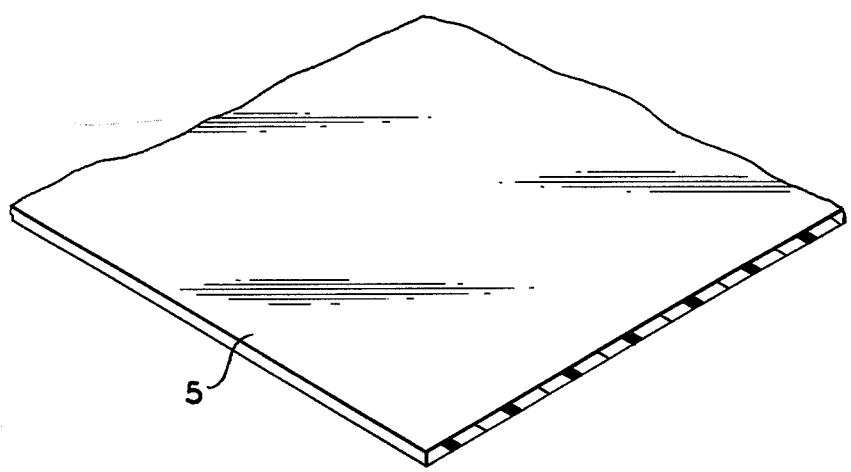
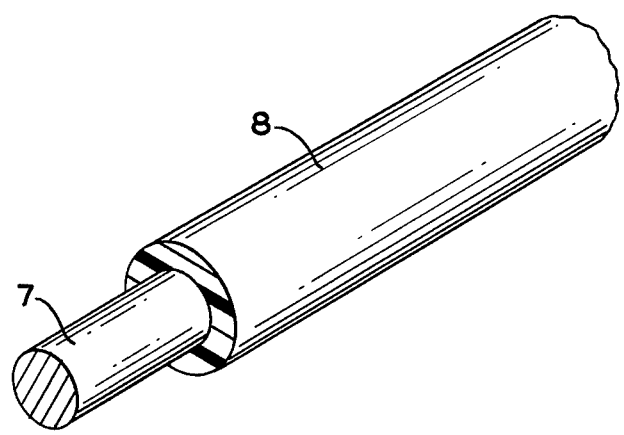
FIG. 2

CONDENSATION PRODUCTS OF AROMATIC POLYHYDROXY COMPOUNDS AND POLYAMINO ALIPHATIC COMPOUNDS

This is a continuation of application Ser. No. 371,636 filed Jun. 20, 1973 and now abandoned.

This invention relates to polymers which are stable at high temperatures. They are made by condensing aromatic polyhydroxy compounds with aliphatic polyamino compounds. The invention includes the compounds and their preparation.

The reaction of this invention is produced with dihydroxy or other polyhydroxy aromatic compounds rather than dihydroxy or other polyhydroxy aliphatics because the latter do not react with the aliphatic diamines or other aliphatic polyamines to any substantial extent. Aromatic diamines are used rather than aliphatic diamines because they have greater high temperature stability.

The prior art includes Phillips et al. U.S. Pat. No. 3,557,245 which discloses condensing diamino aromatic compounds with dihydroxy aromatic compounds for use as antioxidants.

The polymers are useful in the production of (a) films, such as films used in upholstery, wearing apparel, etc., (b) fibers used in the production of fabrics, etc., (c) in various types of insulation, (d) in hose, mechanical goods, etc., in which high solvent resistance is required and wherever high-temperature resistance is important, and (e) as an antioxidant in rubbers, etc.

In the drawings:

FIG. 1 illustrates film 5 prepared from a condensation product of an aromatic polyhydroxy compound and a polyamino aliphatic compound; and FIG. 2 illustrates a wire 7 with a coating 8 of such a condensation product.

The condensation may be carried out in the presence or absence of a solvent. If carried out in the absence of a solvent, the temperature may range from a temperature at which the reactants or reacting composition is liquid to a temperature just below the boiling point of the reacting mixture, e.g., a temperature of 125° to 350° C. or preferably 150° to 300° C. Any inert solvent may be used. In the use of a dialkyl formamide it would be necessary to be sure that the solvent is free of primary amine which would terminate the polymerization. Ethers, such as dialkyl or diaryl ethers, will generally be inert and suitable for use as are the aliphatic alcohols. It appears that any usual solvent which is dry and otherwise inert may be employed. The condensation may be carried out at substantially any temperature below that at which the solvent in solution boils; temperatures around about 200° C. generally being preferred.

The aliphatic diamines which may be employed include, for example, the straight-chain or side-chain diamines in which there are 2 to 20 or 30 or more and even as many as 60 carbon atoms including, as examples: 1,6-diamino hexane, 1,10-diamino decane, 1,2-diamino ethane, 1,3-diamino propane, 1,4-diamino butane, 1,3-diamino butane, 1,8-diamino octane, 1,12-diamino, dodecane, etc., 1,20-diamino licosane, etc., 1,2-bis(methyl amine) cyclobutane, etc.; also, compounds of the type $H_2N$-Alkyl-ene-X-Alkylene-$NH_2$ in which X is oxygen or sulfur or an arylene or amino group, and the alkyl group is 2 to 20 or more carbon atoms.

The aromatic polyhydroxy compound may be a mono or multi-nuclear compound, such as, for instance, the di- and tri- etc., polyhydroxy benzenes, naphthalenes, anthracenes, pyrenes, etc., such as 2,7-dihydroxynaphthalene, 1,4-dihydroxynaphthalene and 2,6-dihydroxynaphthalene and similar aromatic dihydroxy, etc. compounds in which the ring is substituted by alkyl, etc. unreactive groups.

The reaction is preferably carried out in the presence of a condensation catalyst such as, for example, iodine, toluene sulphonic acid, sodium bisulfite, calcium chloride, zinc chloride, hydrochloric acid, etc.

The following equation is illustrative:

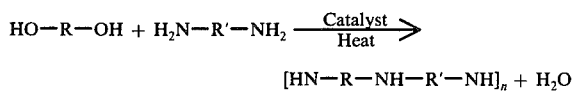

$$HO-R-OH + H_2N-R'-NH_2 \xrightarrow[\text{Heat}]{\text{Catalyst}}$$

$$[HN-R-NH-R'-NH]_n + H_2O$$

in which R is an alkylene group and R' is an arylene group. One or both terminal groups may be amine or hydroxy groups depending upon whether the polymer is terminated by R and R'.

The following examples are illustrative, but the invention is not limited by them.

EXAMPLE 1

MELT PREPARATION OF POLYMER 1,6-diaminohexane (1.743 g., 0.0015 mole), 2,7-dihydroxynaphthalene (2,403 g., 0.0015 mole) and p-toluene sulfonic acid (0.258 g., 0.0015 mole) were placed in a 100 ml., three-necked, round-bottom flask. A magnetic stirring bar was placed inside the flask. A thermometer and a Dean-Stark azeotrope trap with a reflux condenser attached were fitted on to the flask and through the third neck a stream of nitrogen was introduced. The contents were slowly heated by a heating mandrel to 165° C. and maintained for one hour at 165°–180° C. under nitrogen. Some water appeared to be given off at about 160° C. and the magnetic stirrer became ineffective due to the high viscosity of the melt after 20 minutes at 165° C. The brown product was extracted with benzene for 14 hours. Evaporation of the benzene extract yielded essentially no residue. The extracted sample was dried in a vacuum oven at 40° C. and 30 inch vacuum for 12 hours. The yield of the polymer product was 95 per cent (3.42 g.), m.p. greater than 328° C. Analysis: Calculated for high polymer $(C_{16}H_{20}N)_n$: C, 79.94%; H, 8.40%; N, 11.66%. Found: C, 81.46%; H, 7.98%; N, 8.99%. The polymer was insoluble in the usual organic solvents and swelled in dimethyl acid amide and dimethylformamide. The IR spectrum of the polymer showed bands which identified it as poly-N,N',N'',N'''-(1,6-hexyl-2,7-naphthyl amine).

EXAMPLE 2

SOLUTION PREPARATION OF POLYMER

Apparatus such as described in Example 1 was used.

Equimolar amounts of the same monomers (0.002 mole), and p-toluene sulfonic acid (0.025 g.) were dissolved in 30 ml. decalin and heated for 19 hours at 170°–180° C. under nitrogen. The warm reaction mixture was filtered and the brownish-violet powder was washed with three 25 ml. portions of anhydrous methanol and was dried at 40°C. for 12 hours under 30 inch vacuum. The polymer (0.49 g.) was obtained in quantitative yield and showed no melting point below 328° C. Analysis, found: C, 79.56%; H, 8.86%; N, 10.29%.

The product was insoluble in benzene and ethanol, but slightly soluble in dimethyl acid amide. The number average molecular weight for the soluble portion, as determined by osmotic pressure measurements, was 2300. The IR spectrum showed expected bands which identified the product as the same as that produced by Example 1.

The process was repeated under substantially the same conditions, but 1-hexanol was used for the polymerization solvent. A good yield of polymer was obtained.

EXAMPLE 3

Equimolar amounts (0.005 mole) of the same reactants were dissolved in 15 ml. of diphenyl ether in similar equipment and heated for 22 hours at 190°–200° C., under nitrogen, using a slight vacuum for the last hour. The solution was clear initially then turned light olive green to dark olive green then clear bright green, then tea-brown, then cherry red and finally very dark brown. Some precipitate began to appear shortly after the monomers went into solution. The precipitate was filtered from the cool diphenyl ether and washed with three 20 ml. portions of warm ethanol. After drying for 12 hours at 40° C. under 30 inches vacuum a brown product (0.90 g., 75 per cent yield) with no melting point below 328° C. was obtained. Analysis, found: C, 78.45%; H, 8.30%; N, 10.59%.

The polymer product was about 1% low, both in carbon and nitrogen relative to the calculated values for a high polymer.

It was insoluble in benzene and was very slightly soluble in dimethyl acid amide and dimethyl formamide. The intrinsic viscosity in dimethyl formamide of the soluble portion was 0.175. The IR spectra showed the bands identifying the polymer as the same as that produced in each of the foregoing examples.

EXAMPLE 4

Equimolar amounts (0.015 mole) of 1,10-diaminodecane and 2,7-dihydroxynaphthalene with p-toluene sulfonic acid (0.258 g., 0.0015 mole) were dissolved in 15 ml. warm diphenyl ether in similar equipment and slowly heated to 150° C. The heating was maintained 7 hours at 150°–160° C. and then 13 hours at 210°–220° C. under nitrogen. A slight vacuum was applied for the last hour. Upon cooling the reaction mixture was solid throughout but 15 ml. diphenyl ether were recovered by suction filtration. The product was then washed continuously with ethanol (125 mol.) until the alcohol was clear. The polymer was dried in a vacuum oven at 41° C. for 12 hours under 30 inches vacuum. A violet colored product (4.03 g., 91%) was obtained, m.p. 115°–119° C. Analysis: Calculated for high polymer $(C_{20}H_{28}N_2)_n$: C, 81.01%; H, 9.54%; N, 9.45%. Found: C, 80.04%; H, 9.56%; N, 8.46%.

The polymer product was insoluble in ethanol. It was slightly soluble in dimethyl formamide yielding a much swollen, gel-like translucent material which was filtered off. It had an intrinsic viscosity of 0.315. The IR spectrum showed it to be poly-N,N',N'',N'''-(1,10-decyl-2,7-naphthylamine).

The portion soluble in dimethylformamide was cast and a film (0.0025 inches thick) was produced on evaporation of the solvent. It was sufficiently flexible to permit creasing without breaking. It had a tensile strength of 386 psi and an elongation of 14.5%.

The material is suitable for insulation to be applied to wire, etc. as a film or in solution. Such film and insulated wire are illustrated in FIGS. 1 and 2. FIG. 1 shows transparent film 5, and FIG. 2 shows wire 7 coated with insulation 8. The film and insulation may be any of the condensation products covered herein.

EXAMPLE 5

Several polymers were used as an antioxidant in rubber.

Test recipes were compounded from the following:

|  | Parts |
|---|---|
| SBR (prepared in solution) | 100 |
| HAF Carbon Black | 50 |
| Plasticizer Oil | 10 |
| Antioxidant | 1 |

Antioxidants used are identified in the following table by number as follows:

ANTIOXIDANT

No. 1 Polymer from 1,4-diaminobenzene and 2,7-dihydroxy naphthalene prepared in melt.

No. 2 Polymer from 1,6-diaminohexane and 2,7-dihydroxy naphthalene prepared in melt.

No. 3 Polymer from 1,6-diaminohexane and 2,7-dihydroxy naphthalene prepared in diphenylether.

No. 4 Polymer from 1,10-diaminodecane and 2,7-dihydroxy naphthalene prepared in diphenylether.

The different compounds after curing 50 minutes at 293° F. had the following properties before aging and after aging 9 days at 212° F.:

|  | Control | Compound A | Compound B | Compound C | Compound D |
|---|---|---|---|---|---|
| Antioxidant: | None | No. 1 | No. 2 | No. 3 | No. 4 |
| Before Aging | Normal Stress-Strain Properties: | | | | |
| 200% Mod., psi | 1100 | 1100 | 975 | 1300 | — |
| Tensile Strength, psi | 1875 | 1350 | 1400 | 1350 | 1325 |
| Elongation, % | 270 | 220 | 250 | 210 | 180 |
| After Aging: | | | | | |
| Tensile Strength, psi | 1325 | 1075 | 1350 | 1150 | 1175 |
| Retention, % | 71 | 80 | 97 | 85 | 89 |

The various compounds showed good tensile strength retention after aging.

A polymer was similarly prepared from 2,7-dihydroxynaphthalene and 1,2-bis-(methylamine) cyclobutane, using iodine as the catalyst.

Attempts were made to condense an aromatic dihydroxy compound with an aliphatic diamine, using dimethyl formamide as solvent. No substantial amount of polymer was obtained, probably because primary amine or water was present which terminated the polymer chain.

I claim:

1. The method of producing a polymer of (1) an aromatic polyhydroxy compound in which the ring portion of the compound is unsubstituted or alkyl-substituted and (2) an aliphatic polyamine of the class consisting of (a) aliphatic polyamines in which the hydrocarbon contains 2 to 60 carbon atoms and (b) polyamines of the formula $H_2N$-alkylene-X-alkylene-$NH_2$ in which X is oxygen, sulfur or an arylene or amino group, and the alkyl groups contain 2 to 20 carbon atoms, which comprises heating substantially equimolar amounts of the reactants in the presence of a condensation catalyst and thereby obtaining a polymer by condensation of amine groups with hydroxy groups.

2. The method of claim 1 in which an aromatic dihydroxy compound is condensed with an aliphatic diamine in melt polymerization.

3. The method of claim 1 in which an aromatic dihydroxy compound is condensed with an aliphatic diamine in solution polymerization.

4. The method of claim 1 in which the polyhydroxy compound is a dihydroxy naphthalene.

5. The method of claim 1 in which the polyamine is a diamino-hexane.

6. The method of claim 1 in which the polyamine is a diamino-decane.

7. A film or fiber forming polymer composed of alkylene units containing 2 to 60 carbon atoms and alternating aromatic units in equal number joined by NH-groups, said aromatic units being unsubstituted or alkyl substituted ring compounds.

8. A straight-chain polymer of claim 7 which consists of said alkylene and aromatic units alternating with one another.

9. The polymer of claim 7 in film form.

* * * * *

UNITED STATES PATENT OFFICE
CERTIFICATE OF CORRECTION

Patent No. 4,094,860　　　　　　　　Dated June 13, 1978

Inventor(s) Joseph Kestutis Valaitis and Harold James Harwood

It is certified that error appears in the above-identified patent and that said Letters Patent are hereby corrected as shown below:

Column 2, line 23
　"and" should be -- or --

Column 3, line 6
　"2300" should be -- 23,000 --

Signed and Sealed this

Ninth Day of October 1979

[SEAL]

Attest:

RUTH C. MASON
Attesting Officer

LUTRELLE F. PARKER
Acting Commissioner of Patents and Trademarks